US008332251B1

(12) United States Patent
Morris et al.

(10) Patent No.: US 8,332,251 B1
(45) Date of Patent: Dec. 11, 2012

(54) METHOD AND SYSTEM FOR ALLOCATION OF RESOURCES IN AN AGILE ENVIRONMENT

(75) Inventors: Sean Morris, Renmore (IE); Keith Kroeger, Renmore (IE); Thomas McGuire, Claregalway (IE); Igor Nikolaev, Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/407,109

(22) Filed: Feb. 28, 2012

Related U.S. Application Data

(63) Continuation of application No. 13/270,773, filed on Oct. 11, 2011.

(51) Int. Cl.
*G06Q 19/00* (2006.01)
(52) U.S. Cl. ...................................... 705/7.22
(58) Field of Classification Search .................. 705/7.22
See application file for complete search history.

(56) References Cited

U.S. PATENT DOCUMENTS

| | | | |
|---|---|---|---|
| 2005/0283390 A1* | 12/2005 | Helander et al. | 705/7 |
| 2008/0167930 A1* | 7/2008 | Cao et al. | 705/8 |
| 2009/0125892 A1* | 5/2009 | Crewdson | 717/136 |
| 2010/0088138 A1* | 4/2010 | An et al. | 705/8 |
| 2011/0081632 A1* | 4/2011 | Garg | 434/118 |

OTHER PUBLICATIONS

Optimized Resource Alloation for Software Release Planning—By Ngo-The et al. 2009 IEEE.*
Intelligent Support for Software Release Planning—Amandeep et al. PROFES 2004, LNCS 3009, pp. 248-262, 2004.*
Conceptual scheduling model and optimized release scheduling for agile environments—By Akos Szoke Feb. 2011 (Document provided by Applicants).*
Barreto et al., "Staffing a Software Project: A Constraint Satisfaction and Optimization-based Approach," Computers & Operations Research 35 (2008), pp. 3073-3089.
Chang et al., "Time-line Based Model for Software Project Scheduling with Genetic Algorithms," Information and Software Technology 50 (2008), pp. 1142-1154.
Szoke, "Conceptual Scheduling Model and Optimized Release Scheduling for Agile Environments," Information and Software Technology, vol. 53, Issue 6, Jun. 2011, pp. 574-591.

* cited by examiner

*Primary Examiner* — Andre Boyce
*Assistant Examiner* — Ernest A Jackson
(74) *Attorney, Agent, or Firm* — Proskauer Rose LLP

(57) ABSTRACT

A computer-implemented method is provided for optimizing allocation of resources across stories for a release within an Agile development environment. The method includes receiving (i) resource information representing a plurality of resources available for allocation to the stories, (ii) one or more story definitions, each story definition comprising a unique identifier and one or more story-level constraints corresponding to a story, (iii) release information, (iv) iteration information, and (iv) one or more optimization criteria. The method also includes generating a plurality of story-level allocation scenarios and determining one or more optimized story-level allocation scenarios from the plurality of story-level allocation scenarios. Each story-level allocation scenario satisfies the one or more story-level constraints associated with each story definition. Each optimized story-level allocation scenario optimizes assignment of iterations or allocation of resources to the stories to satisfy the one or more optimization criteria.

16 Claims, 11 Drawing Sheets

METHOD AND SYSTEM FOR ALLOCATION OF RESOURCES IN AN AGILE ENVIRONMENT

CROSS-REFERENCE TO RELATED APPLICATIONS

This application is a continuation of U.S. patent application Ser. No. 13/270,773 filed Oct. 11, 2011, the entire contents of which are hereby incorporated by reference.

FIELD OF THE INVENTION

The invention relates generally to computer-implemented methods and apparatuses, including computer program products, for allocating resources in an Agile environment, and more particularly, to generating optimized scenarios of resource allocation to Agile stories to satisfy one or more constraints associated with the stories as well as higher-level optimization criteria.

BACKGROUND OF THE INVENTION

Product development management involves, in part, planning, organizing, securing and managing resources to bring about the successful completion of a project with respect to specific goals and objectives. Project managers can manage resources using, for example, Agile development approaches, which are characterized by factors such as relatively short time-frame intervals (often referred to as sprints or iterations), delivery of certain goals at the end of each iteration, and regular adaptation of requirements and designs in response to changing circumstances. Exemplary changes in circumstances include changes in business goals, changes driven by customer feedbacks, changes driven by improved understanding of technological challenges, changes to downstream features based on cumulative knowledge, changes in skills and resources, and changes derived from improved knowledge of estimates of work completion based on team velocity.

Under Agile development methods, a project can be organized into one or more features with each feature delivering a package of related functionalities that an end user generally expects to get all at once. In turn, each feature can be broken down into a collection of related stories with each story defining a particular functionality. For example, given a feature involving programming inline table resizing, it can be broken down into three stories—resizing columns, resizing rows and resizing the table itself. In addition, a working feature or product can be produced at the end of a release, during which the feature or product is refined through successive iterations. Typically, each iteration involves a team working through a full development cycle including the phases planning, designing and testing. Thus, Agile methods minimize overall risks by allowing a project to adapt to changes quickly.

Even though the Agile model is generally preferred by developers, the model still poses many challenges. One challenge for any team of developers is trying to accommodate changes in customer priorities and demands throughout the life cycle of a project. Another challenge is trying to better estimate at a granular level how many and different types of stories for any given feature or project the team can deliver over a release or even an iteration. In many cases, a team may not be able to deliver all the stories in a single iteration or a release due to various subjective and objective constraints coming from stakeholders (e.g., project managers and/or customers). Furthermore, fluctuations in constraints and resource availability make project planning even more difficult.

SUMMARY OF THE INVENTION

Methods and apparatus are provided to optimize resource utilization across stories over a release period within the Agile development framework. The methods and apparatus overcome deficiencies in today's Agile planning process and ensure that the time taken to plan a typical release can be reduced from a week in existing processes to a matter of hours or less. For example, time spent on planning can be reduced from between 5 and 7 days with existing processes to 3 or 4 of hours. In many cases, time spent on planning can be reduced by about 80% or more. An optimal fit of stories can be identified based on the constraints provided. A better feedback system can be implemented that uses actual effort to estimate demand on a particular type of story. The present invention also generates better quality planning, enables faster and easier updates to existing plans, and facilitates easier understanding of the impact of a scope trade off, which represents a balance between the values of certain features or stories and the amount of efforts involved to deliver these features or stories.

A project management system can use constraint programming and/or linear programming to plan the allocation of resources to one or more stories in a project for a release. The programming techniques can be based on the techniques described in U.S. Pat. No. 7,991,632, the entire content of which are incorporated herein by reference. Through the application of constraint programming, a project manager and/or a project team can realize a high level of efficiency in a short time. Specifically, by applying one or more supply-side and/or demand-side constraints, a project developer can identity, for example, which stories need to be delivered first or which story is instantly feasible without the need for full re-planning. In some embodiments, linear programming can be employed to realize similar goals.

In one aspect, there is a computer-implemented method, used in an Agile environment, for planning allocation of resources across a plurality of stories in a project during a release. Within the Agile environment, the release represents a deadline for delivering the stories and is divided into one or more iterations. Changes to the stories are incorporated into project planning at the beginning of each iteration and an enhanced plan for any remaining stories is delivered at the end of each iteration. The method includes receiving, at a computing device, (i) resource information representing multiple resources available for allocation to the stories, (ii) one or more story definitions, each story definition comprising a unique identifier and one or more story-level constraints corresponding to a story, (iii) release information defining the release, (iv) iteration information defining the one or more iterations within the release, and (iv) one or more optimization criteria for a level different from a story level. The method also includes generating, using the computing device, multiple story-level allocation scenarios. Generating each story-level allocation scenario includes assigning an iteration to each of the unique identifiers and allocating one or more of the resources to one or more of the unique identifiers. The assignment of the iterations and the allocation of the resources to the one or more unique identifiers satisfy the one or more story-level constraints associated with each story definition. The method also includes determining, using the computing device, one or more optimized story-level allocation scenarios from the story-level allocation scenarios. Such determination optimizes assignment of iterations or allocation of resources to the unique identifiers to satisfy the one or more optimization criteria.

In another aspect, there is a computer program product, tangibly embodied in a non-transitory machine-readable storage device, for optimizing allocation of resources across stories in a project during a release within an Agile development environment. The release represents a deadline for delivering the stories and is divided into one or more iterations. Changes to the stories are incorporated into project planning at the beginning of each iteration and an enhanced plan for any remaining stories is delivered at the end of each iteration. The computer program product including instructions being operable to cause data processing apparatus to receive (i) resource information representing a plurality of resources available for allocation to the stories, (ii) one or more story definitions, each story definition comprising a unique identifier and one or more story-level constraints corresponding to a story, (iii) release information defining the release, (iv) iteration information defining the one or more iterations within the release, and (iv) one or more optimization criteria for a level different from a story level. The computer program product also includes instructions being operable to cause the data processing apparatus to generate a plurality of story-level allocation scenarios by assigning an iteration to each of the unique identifiers and allocating one or more of the plurality of resources to one or more of the unique identifiers. The assignment of the iterations and the allocation of the resources to the one or more unique identifiers satisfy the one or more story-level constraints associated with each story definition. The computer program product further includes instructions being operable to cause the data processing apparatus to determine one or more optimized story-level allocation scenarios from the plurality of story-level allocation scenarios. Such determination optimizes assignment of iterations or allocation of resources to the unique identifiers to satisfy the one or more optimization criteria.

In other examples, any of the aspects above can include one or more of the following features. In some embodiments, determining one or more optimized story-level allocation scenarios includes selecting, using the computing device, a first story-level allocation scenario from the plurality of the story-level allocation scenarios and revising, using the computing device, assignment of iterations or allocation of resources to the unique identifiers in the first story-level allocation scenario to satisfy the one or more optimization criteria. In some embodiments, determining one or more optimized story-level allocation scenarios includes assigning, using the computing device, a weight to each of the one or more optimization criteria and determining, using the computing device, the one or more optimized story-level allocation scenarios by satisfying the one or more optimization criteria scaled by their respective weights. In some embodiments, determining one or more optimized story-level allocation scenarios includes determining, using the computing device, an order for applying the one or more optimization criteria and determining, using the computing device, the one or more optimized story-level allocation scenarios by satisfying the plurality of optimization criteria successively applied in the order.

In some embodiments, the level different from the story level includes an iteration level, a release level, or a feature level. In some embodiments, the one or more story-level constraints includes one or more start dates or date ranges, one or more end dates or date ranges, one or more resource constraints, a cost constraint, one or more location constraints, or any combination thereof. In some embodiments, the one or more optimization criteria include a resource utilization criterion, a schedule criterion, a risk level criterion, a maximum-number-of-features criterion, or any combination thereof.

In some embodiments, the plurality of resources includes one or more human resources, one or more physical resources, or any combination thereof. In some embodiments, the plurality of resources includes one or more physical resources including one or more computer resources, one or more geographic locations, one or more supply materials, one or more equipment items, or any combination thereof. In some embodiments, the resource information includes attribute information for one or more of the plurality of resources. The attribute information can include skills information, geographic location information, language information, availability information, or any combination thereof, for one or more human resources.

In some embodiments, each story definition associated with the release further includes information indicating a priority level. In such a case, allocating one or more of the plurality of resources to one or more of the unique identifiers includes allocating resources to a first unique identifier before allocating resources to a second unique identifier. The first unique identifier is associated with a first priority level higher than a second priority level associated with the second unique identifier.

In some embodiments, assigning an iteration to each of the unique identifiers includes assigning, using the computing device, a null value to at least one unique identifier indicating that the story associated with the at least one unique identifier is canceled or not scheduled for the release.

The method and computer program product can further include automatically executing the generating and the determining steps upon detecting a change to at least one of the resource information, the story definitions, the release information, the iteration information and the optimization criteria.

The method and computer program product can further include generating an action plan based on the one or more optimized story-level allocation scenarios. The action plan includes at least one of modifying resource allocation of the plurality of resources or acquiring additional resources.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DESCRIPTION OF THE INVENTION

Figure 1:
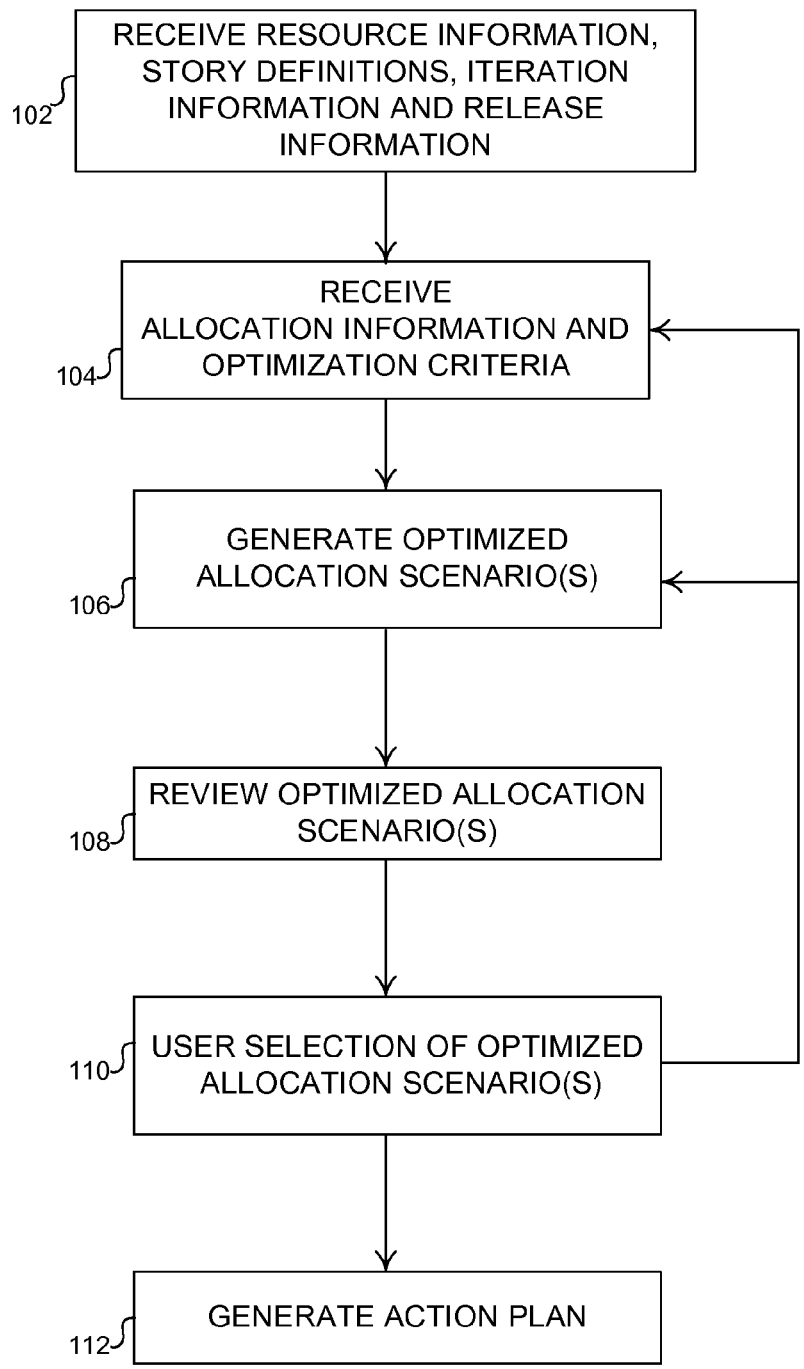
FIG. 1 is an exemplary flowchart depicting a general process flow associated with the management of stories for a release plan.

FIG. 1 is a flowchart 100 depicting a general process flow associated with the management of stories for a release plan. In particular, the flowchart 100 details the workflow through which a user can interface with a project management system to optimize the allocation of resources to stories in a release. The elements of the flow chart 100 are described using the exemplary project management system 200 of FIG. 6a. Optimization of resource allocation to stories can include receiving resource information, story definitions, iteration information and release information (step 102), receiving allocation information and one or more optimization criteria (step 104), generating optimized allocation scenario(s) for the stories over one or more iterations of a release (step 106), reviewing the optimized story-level allocation scenario(s) (step 108), allowing an end user to select at least one optimized story-level allocation scenario (step 110) and generating an action plan (step 112).

Resource information that is provided to and received (step 102) by the project management system 200 can include information that represents resources available for allocation to one or more stories in a release. Story definitions that are provided to and received (step 102) by the project management system 200 can represent the stories for which allocation of the identified resources (including, e.g., the volume or number of resources) are required. Release information that is provided to and received (step 102) by the project management system 200 can include a deadline for delivering the stories as working feature(s) or product(s). Iteration information that is provided to and received (step 102) by the project management system 200 can represent one or more iteration deadlines within the release. In general, the resource information, story definitions, iteration information and release information can be provided and/or received (step 102) as a data structure such as, for example, textual lists, XML documents, class objects (e.g., instances of C++ or Java classes), other data structures, or any combination thereof. Story definitions can be provided as a set of one or more baseline (e.g., currently planned and/or existing) stories, as a set of one or more new story definitions, or any combination thereof.

Resource information can represent a plurality of resources, which can range from human personnel (e.g., computer programmers, accountants, employees, consultants, etc.) to physical resources (e.g., a computer resources, infrastructure resources such as a geographic locations or buildings/office space, any type of supply or manufacturing material, physical equipment items, etc.). Human resource information can include attribute information defining one or more of any of the following: type attributes (e.g., full-time employee, part-time employee, contractor, temp, etc.), role attributes (e.g., project manager, architect, analyst, QA engineer, database manager/administrator, computer programmer), role-level attributes (e.g., a principal role, a senior role, an entry-level role, a graduate role, etc.), skill attributes (e.g., Java, C++, or generally any knowledge/ability to undertake a required activity), geographic attributes (e.g., one or more cities/countries or other locations where person is available to work), education attributes (e.g., Ph.D., M.B.A., J.D., etc.), language attributes (e.g., French, German, etc.), cost attributes (e.g., $/hour), experience attributes (e.g., years of experience working on regulatory compliance), fungibility, human fragmentation attributes (e.g., the capability to be assigned to multiple tasks), security attributes (e.g., security clearance, etc.), criticality attributes (e.g., a measure of the importance of a human resource), and/or any combination thereof.

Physical resource information can include attribute information defining one or more of any of the following: geographic attributes (e.g., one or more locations where physical resource can be used or accessed), cost attributes (e.g., cost to use per hour, cost of supply per unit, etc.), availability attributes (e.g., information indicating times/dates and/or locations that the resource is available for use and not yet assigned), supply attributes (e.g., amount of supply), throughput attributes (e.g., network bandwidth, system capacity, physical space, etc.), security attributes, and/or any combination thereof. In some embodiments, the plurality of resources represented by the resource information can include both human personnel and physical resources in any combination thereof.

Release information, which provides a deadline for delivering the stories as working feature(s) or product(s), can include a start-date, an end-date, a duration limitation, and/or any combination thereof. Iteration information provides one or more iteration deadlines within a release. Similar to the release information, iteration information for one iteration can include a start-date, an end-date, a duration limitation, and/or any combination thereof. Exemplary iteration information includes the earliest start date, latest finish date, or an estimate of how many days an iteration may take. Iterations in a single release can have the same duration or varying durations. In some embodiments, if a release plan includes one iteration, the duration of the release and the duration of the iteration are the same. In some embodiments, if several iterations are defined for a release plan, the duration of each iteration is shorter than that of the release.

A story can be represented by at least a starting date and an end date or a specific iteration during which the story is expected to be completed. Completion of a story also requires certain amount of resources. Specifically, a story can be defined by one or more story-level constraints including, for example, one or more resource constraints, schedule constraints, cost constraints, risk constraints, criticality constraints, technology constraints, or any combination thereof.

Resource constraints of a story define what resources are required or can be used for the successful completion of the story. Exemplary resource constraints include human or machine utilization level, team utilization level, resource fragmentation level and location fragmentation data (e.g., distributed agile teams.) In some embodiments, a resource constraint can define a minimum or maximum number of resources required. Resource constraints can also specify a minimum level of experience, certification, and/or security clearance. Aside from resource constraints that specify a general constraint, resource constraints can also specify a specific resource (e.g., the name of a particular person or physical resource). In some embodiments, resource constraints can include an estimate of effort required to complete a story. For example, if the probability of timely completing a task is high, such as around 90%, then less effort is required. In this case, the effort level can be expressed as "highly probable" (HP). In contrast, if the probability of timely completing a task is lower, such as around 50%, then more effort is required. In this case, the effort level can be expressed as "aggressive but possible" (ABP). In general, resource constraints can be tied to or associated with any resource attribute described above.

Schedule constraints for a story can include a start-date, an end-date, one or more milestone date constraints, a duration constraint, an iteration constraint, or any combination thereof. Exemplary schedule constraints include earliest start date, latest finish date, or an estimate of how many days, expressed as points, a story may take. In some embodiments, a schedule constraint for a story can be defined as a hard constraint or an unchangeable constraint (e.g., for high priority stories, for stories in-flight, or for stories in which the investment therein has surpassed a threshold amount). In some embodiments, a date constraint can be made dependent on the completion of any date or event associated with another story in the same feature, in the same project or in a different project.

A cost constraint for a story can set a minimum or maximum limit on the amount of money (e.g., spent on resources) estimated to be spent on the story. A return-on-investment (ROI) constraint can set a minimum limit on the profitability or ROI of a story.

Criticality constraints (e.g., a priority level) for stories can be used by the project management system 200 as a guide to order stories for determining which stories get allocated resources first in an iteration or release. A criticality constraint can also be used to determine whether a story can be deferred to a later iteration or not implemented altogether if insufficient resources are available for its successful completion.

Each story can be identified by a unique identifier (e.g., the story name, a number code, or other identifier). Accordingly, in addition to story-level constraints, a story definition can also include its unique identifier to enable the project management system 200 to reference the story.

Before, after, and/or concurrently with receiving the resource, story, iteration and release information (step 102), allocation information can be received by the project management system 200 (step 104). Allocation information can indicate the baseline state (e.g., current state) of resource allocation to stories in a release. For example, the baseline state can include information representing the current allocation of one or more resources and/or assignment of iterations to stories in a release. The baseline state of resource allocation can be generated by the project management system 200 or by another resource planning system. Optimization criteria can represent higher-level objectives to be achieved when determining one or more optimized story-level resource allocation scenarios. An end user is allowed to define these optimization objectives, such as maximization of resource utilization in a release and/or minimization of story schedule delays in a release. In general, allocation information and optimization criteria can be provided and/or received (step 104) as a data structure such as, for example, textual lists, XML documents, class objects (e.g., instances of C++ or Java classes), other data structures, or any combination thereof.

Figure 2:
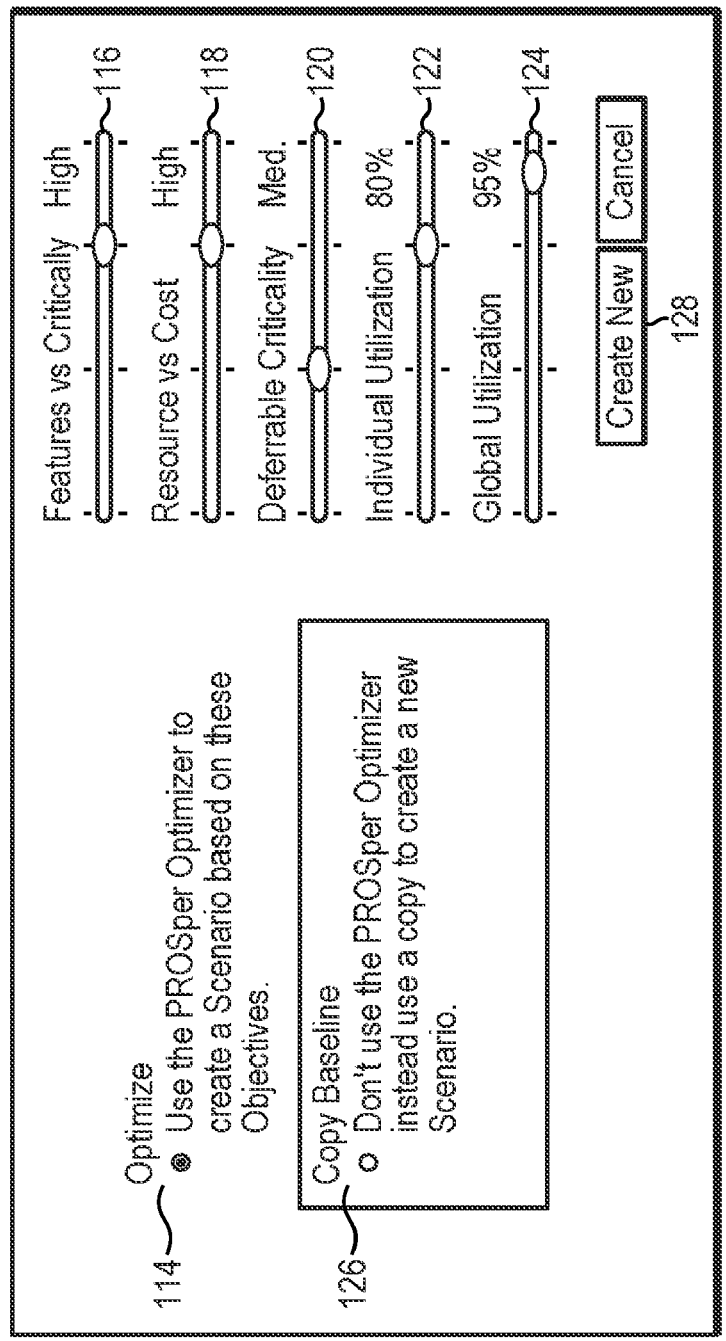
FIG. 2 is an exemplary graphical user interface of a project management system for receiving optimization criteria and allocation information.

FIG. 2 is an exemplary graphical user interface of the project management system 200 for receiving optimization criteria and allocation information. From the graphical user interface, a user can choose to generate an optimized story-level allocation scenario by selecting an "optimize" option box 114 followed by activating the "create new" button 128. The user can customize the objectives to be achieved through optimization by selecting one or more optimization criteria from a list of criteria 116-124. One exemplary optimization criterion is a "features vs criticality" criterion 116 that allows a user to instruct the system 200 to schedule as many features or stories as possible across one or more iterations in a release plan or as many critical features or stories as possible, or a balance of the two considerations. Another exemplary optimization criterion is a "resource vs cost" criterion 118 that allows a user to instruct the system 200 to allocate resources to stories without considering cost or resource utilization or specify a specific balance of the two considerations. Another exemplary optimization criterion is a "deferrable criticality" criterion 120 that allows a user to instruct the system 200 to defer execution of stories with criticality levels less than or equal to a certain user-selected threshold. Other exemplary optimization criteria include: an "individual utilization" criterion 122 for allowing a user to specify the percentage of resource utilization per iteration, and a "global utilization" criterion 124 for allowing a user to specify the percentage of resource utilization per release. Selection of an optimization criterion can involve a user making a selection on a sliding scale associated with each criterion. For example, with respect to the "deferrable criticality" criterion 120, a user can select a criticality threshold on a scale of 1 to 5 such that stories with criticality levels below this threshold may be deferred. In some embodiments, a user can specify different weighting factors for one or more of the optimization criteria.

The graphical user interface can also provide a user with the option 126 to load a previously stored allocation scenario and use it as the baseline scenario instead of creating a new allocation scenario. In certain embodiments, a user can load a previously stored allocation scenario as well as create a new allocation scenario. If a user chooses to load a previously stored allocation scenario, the user can select one or more previously-created scenarios from a list of stored scenarios (not shown). In various embodiments, a user can use the graphical user interface to manually edit (e.g., add, remove, modify) the baseline allocation of resources and/or assignment of iterations to stories. In various embodiments, a user can select one or more options of the graphical user interface using option button(s), check box(es), text box(es), drop-down list(s), etc., or any combination thereof.

Figure 3:
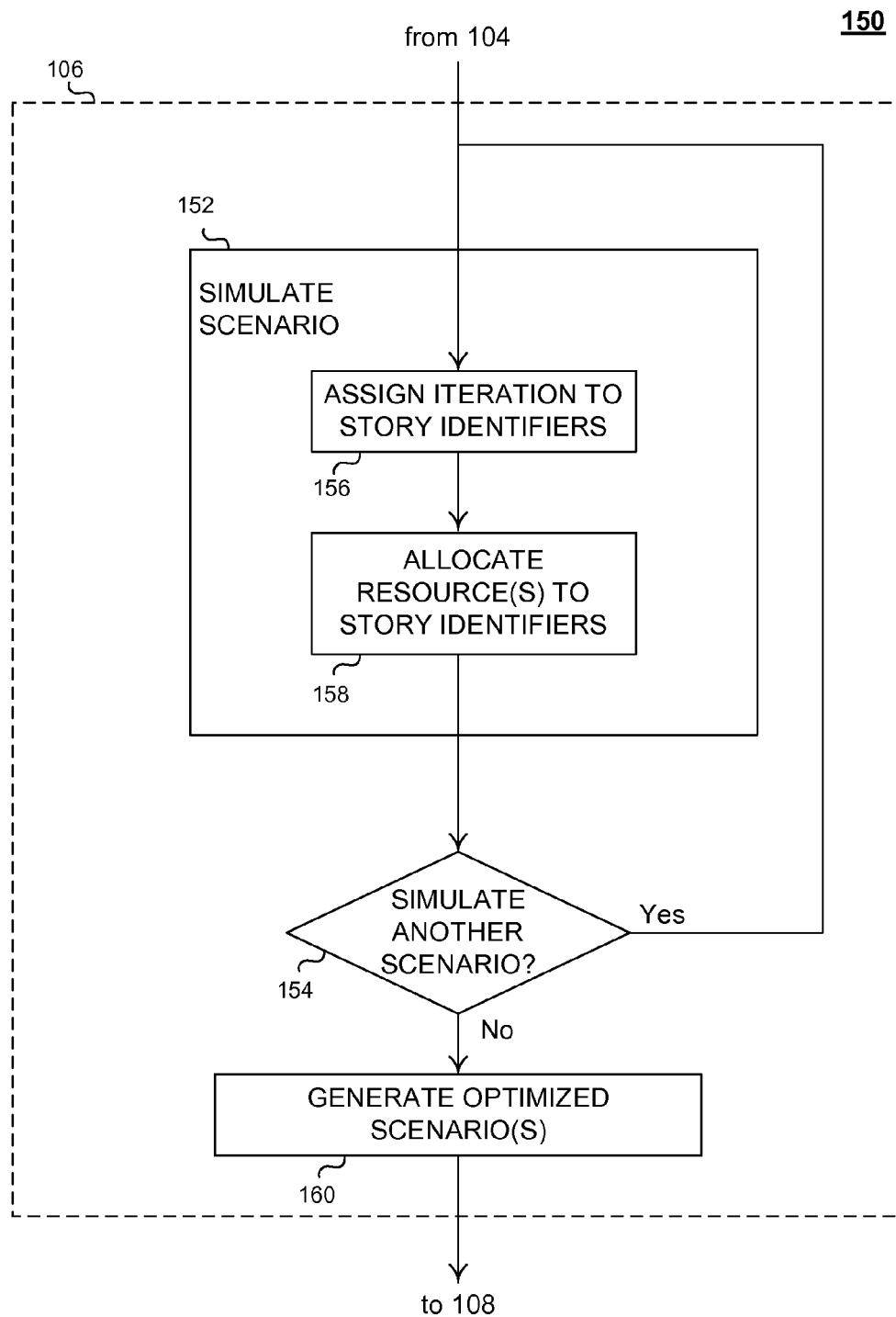
FIG. 3 is an exemplary flowchart depicting a general process flow associated with generating optimized allocation scenario(s) for stories over one or more iterations of a release.

FIG. 3 is a flowchart 150 depicting a general process flow associated with generating optimized allocation scenario(s) (step 106) for stories over one or more iterations of a release. Generating optimized story-level allocation scenario(s) (step 106) includes, in part, simulating a single story-level allocation scenario (step 152), and can further include determining whether to simulate another story-level allocation scenario (step 154). Simulating a single story-level allocation scenario can include assigning iteration(s) to one or more story identifiers (step 156) and allocating resources to one or more story identifiers (step 158). If multiple story-level allocation scenarios are generated, an end user can further generate one or more optimized allocation scenarios (step 160). FIG. 3 illustrates that assignment of iterations(s) to story identifiers (step 156) occurs before allocation of resource(s) to story identifiers (step 158), but other process flows can be used. For example, allocation of resource(s) to story identifiers (step 156) can occur before or concurrently with assignment of iteration(s) to story identifiers (step 158).

Assignment of iteration(s) to story identifiers (step 156) can be subject to any schedule-based constraints. For example, if a story has a hard start-by-date constraint of February 1, then the project management system 200 does not assign the associated story identifier to an iteration that ends before February 1. In another example, if a story has a set of hard start and end dates, the project management system 200 need to assign an iteration to the story such that the start and end dates of the story fall within the time limitations associated with the iteration, as provided by the iteration information. Similarly, allocation of resources to story identifier(s)

can be subject to any story-level constraints included in the story definition for the corresponding story identifier.

In some embodiments, assigning iterations to story identifiers (step 156) and/or allocating resources to story identifiers (step 158) can occur in order from those stories with the highest criticality constraint (e.g., priority level) to those stories with the lowest criticality constraint. In some embodiments, allocating resources or scheduling iterations for stories can occur relative to each story's cost, risk, ROI, other story characterization, or any combination thereof. For example, if two or more stories are equal with respect to the ordering parameter, then the stories can be allocated based on the order of their unique identifiers. In some embodiments, if by the time the project management system 200 comes to allocate resources to a story with an associated low criticality level and it is determined that all of the constraint-compatible resources available during the story's date constraint have already been assigned to more critical stories, then the less critical story may be assigned to an iteration later than the one that satisfies the date constraint. The assignment of an iteration to a unique identifier can include assigning an iteration identifier, start and end dates, or a null value to indicate that the corresponding story is canceled or not scheduled for the release.

In general, assignment of iterations (step 156) and/or allocation of resources (step 158) can be accomplished using constraint programming and/or constraint logic programming. Constraint programming searches for a state of a system (e.g., a project scenario) in which a large number of constraints are satisfied at the same time. Constraint programming typically states the problem as a state of the system containing a number of unknown variables. The constraint program then can search for values for all of the variables. In some embodiments, constraint programming can include temporal concurrent constraint programming (TCC), non-deterministic temporal concurrent constraint programming (NTCC), or both TCC and NTCC. Some exemplary examples of constraint logic languages are: B-Prolog, CHIP V5, Ciao Prolog, ECLiPSe, SICStus Prolog, GNU Prolog, Oz programming language, YAP Prolog, SWI Prolog, Claire programming language, Curry programming language, and Turtle programming language. The constraints used in constraint programming can be one or more specified domains (e.g., Boolean domains, integer domains, rational domains, linear domains, finite domains, or any mixed combination thereof).

In some embodiments, hundreds of different story-level allocation scenarios associated with a release can be simulated. For example, the project management system 200 can simulate every permutation of iteration assignment and resource allocation that are possible subject to the story-level constraints. In some embodiments, only a pre-determined number of story-level allocation scenarios need to be simulated. Determining whether to simulate another story-level allocation scenario (step 154) can be based on, for example, whether a predetermined number of story-level allocation scenarios is reached.

In some embodiments, the project management system 200 generates one or more optimized story-level allocation scenarios (step 160) from the multiple story-level allocation scenario(s) (from step 154) to satisfy certain optimization criteria. Optimization criteria represent higher-level objectives to be achieved when determining the optimized story-level allocation scenarios. Specifically, after one or more story-level allocation scenarios that satisfy the story-level constraints are simulated, at least one optimized story-level allocation scenario can be determined from the simulated scenarios by optimizing an objective function while satisfying one or more higher-level constraints. The objective function and the higher-level constraints are thus defined to realize the objectives of the optimization criteria that govern the allocation of resources and/or assignment of iterations to stories in a release.

In general, an objective function determines how close a solution is to satisfy one or more optimization criteria, and constraints associated with the objective function define the domain within which the solution resides. When solving an optimization problem, the objective function is optimized (i.e., maximized or minimized) while subject to the constraints. Therefore, by appropriately defining the objective function and the constraints, optimized solutions can be found that satisfy the objectives of the optimization criteria. In some embodiments, constraint programming and/or constraint logic programming is used to solve the optimization problems.

During optimization (step 160), at least one optimized story-level allocation scenario is determined from the multiple story-level allocation scenarios (from step 154) by optimizing one or more objective functions while satisfying one more higher-level constraints. The objective functions and/or the higher-level constraints can be defined to realize one or more optimization criteria. An exemplary optimization criterion includes a utilization criterion, which can produce allocation scenario(s) to maximize resource utilization in one iteration, several iterations or the entire release. Another exemplary optimization criterion includes a schedule criterion, which can produce allocations scenario(s) with the least amount of time to complete without overshooting available resources. Another exemplary optimization criterion includes a risk level criterion, which can produce allocation scenario (s) with the least amount of cumulative risk associated with one iteration, several iterations or the entire release. Another exemplary optimization criterion includes a feature criticality criterion, which can produce allocation scenario(s) that execute most critical stories soonest in a release. Other exemplary optimization criteria include a return-on-investment (ROI) criterion, which can produce allocation scenario(s) with the most expected gain minus cost over one iteration, several iterations or the entire release, a maximum-number-of-stories criterion, which can produce allocation scenario(s) with the maximum number of stories for one iteration, several iterations or the entire release. In some embodiments, optimization is performed at the feature-level, across one or more features of the stories in a release. For example, a risk level criterion can allocate resources to stories such that features of stories take the least amount of cumulative risk to complete in one iteration, several iterations or a release. As another example, allocation scenario(s) can be produced that execute partially completed features first in a release prior to those features that have yet to start.

In some embodiments, an optimization criterion is a skill criterion as shown Table 1, in which case the objectives function and the higher-level constraints are defined to optimally match skills for open positions to available supplies. In some embodiments, an optimization criterion is a business-outcome criterion for stories, as shown in Table II.

TABLE I

| Match Skills | |
| --- | --- |
| Sub Features | Additional Detail |

Specify how close skills match

TABLE I-continued

Match Skills

| Sub Features | Additional Detail |
|---|---|
| should be, e.g., +/−1 level | |
| Define multiple assignments for individuals who have more than one skill which is a fit for an open position | Maximum number of assignments allowed. |
| Incorporate acceptable degree of fragmentation for a resource into assignment decision | Maximum number of assignments allowed. This can also be dependant on resource type e.g. 1-2 for Dev/QA; 5-7 for Architects/DBA's |
| Incorporate critical named resource for stories into optimization | Assumes some resources are not fungible, e.g., subject matter experts critical to success of project so their availability drives options for story scheduling |

TABLE II

Business Outcome

| Sub Features | Additional Detail |
|---|---|
| Optimize for resource utilization | Ensure that stories are scheduled in such a way as to use all available resources in the backlog within agreed tolerances e.g. +/−5% |
| Optimize for story completion velocity | Schedule stories to minimize time to complete without overshooting available resources in the backlog |
| Optimize for risk | Acceptable cumulative risk score for a given time period |
| Optimize for criticality | Prioritize highest criticality stories first in a schedule and assign resources from the backlog to satisfy the highest criticality stories |
| Optimize for revised estimate | Schedule stories to satisfy changing estimates of resource availability in the backlog. These changes can be made on a periodic basis throughout the life of a project. The changes in resource estimates also reflect changes in the cost of the project. |

An exemplary objective function used to allocate resources to stories in a release to maximize resource utilization (or minimize resource waste) is provided below:

$$\min\left(\sum_{k=1}^{n} P[I_k, x]\right), \quad \text{(Equation 1)}$$

where n represents the number of iterations in the release, $I_k$ represents the $k^{th}$ iteration in the release, and x represents a minimum resource utilization level that can be specified by a user using the sliding scale 122 or 124 of FIG. 2, for example. In addition, function P assigns a penalty to a specific iteration $I_k$ if resource utilization by stories during that iteration is below the minimum level x.

An exemplary objective function used to allocate resources to stories to maximize the number of features completed during one iteration, several iterations or an entire release is provided below:

$$\max\left(\sum_{k=1}^{n} F[S_k]S[S_k]\right), \quad \text{(Equation 2)}$$

where n represents the number of stories in one iteration, several iterations or a release and $S_k$ represents the $k^{th}$ story in the iteration(s) or release. In addition, function F represents a feature-points function, which computes the number of points required for developing a feature containing one or more inter-dependent stories, and function S represents a successful and on-time complete function, which can be a binary function that is set to 1 when the $k^{th}$ story is completed on time as planned or 0 when the $k^{th}$ story is delayed.

An exemplary objective function used to allocate resources to stories to satisfy schedule constraints in a release is provided below:

$$\min\left(\sum_{k=1}^{n} P[S_k]S[S_k]\right), \quad \text{(Equation 3)}$$

where n represents the number of stories in the release and $S_k$ represents the $k^{th}$ story in the release. Penalty function P assigns a penalty to a specific story $S_k$ if the story is not implemented as planned based on a request by customers, for example. Function S represents a successful and on-time complete function.

In addition, optimization criteria can be defined to determine the maximum number of stories that are feasible to implement in one or more iterations of a release based on existing supply of resources available to meet the demand associated with each story. Therefore, in some embodiments, resources available for allocation may not be sufficient to satisfy all story resource demands. In such a situation, the allocation system can defer some stories by not including them in a preferred or planned iteration. Instead, a deferred story can be included in a subsequent iteration. In some cases, a deferred story may not be scheduled at all for the release in view of resource availability. Story deferral can be based on the criticality and/or priority of the stories (e.g., stories that are least critical are most likely to be deferred or cancelled).

In some embodiments, if an end user changes any one of the constraints for the stories and/or resource availability associated with a release, the project management system 200 can automatically re-run the simulation (step 106) to determine one or more new allocation scenarios for the release that satisfy the changed constraints. In general, the project management system 200 provides a dynamic planning process to a user, allowing the user to add new stories at any point of a project and adjust the scope of an iteration or release. For instance, the project management system 200 can reduce or increase the number of iterations in a release any time during the execution of the release based on the optimization results. The project management system can also reduce or increase the number of stories per iteration in a release at any point during the execution of the release.

In some embodiments, a plurality of optimization criteria can be used. Each criterion can be scaled by a weight assigned to the criterion. For example, optimization can be performed to maximize resource utilization and satisfy schedule constraints based on the objective functions provided in Equations 1 and 3. In addition, because different sets of optimized allocation scenario(s) can be generated depending on the order in which optimization criteria are applied, an end user can specify a specific order for applying the optimization criteria.

In some embodiments, determining optimized story-level allocation scenarios includes selecting and revising one or more of the simulated story-level allocation scenarios (from step 154) to optimize an objective function and satisfy one or more higher-level constraints. Therefore, an optimized story-level allocation scenario may be different from any one of the simulated story-level allocation scenarios that satisfy the story-level constraints. In some embodiments, assignment of iterations to stories in an optimized allocation scenario is changed in comparison to the assignments in the simulated allocation scenarios. In some embodiments, allocation of resources in an optimized allocation scenario is changed in comparison to the allocations presented in the simulated allocation scenarios. In some embodiments, multiple optimized allocation scenarios are generated and ranked according to how well they optimize the objective function while satisfying the higher-level constraints. In addition, the project management system 200 can generate optimized allocation scenario(s) (step 106) for multiple releases concurrently.

This hierarchical approach to story planning, as illustrated in FIG. 3, is advantage because optimization is performed at both the story level (i.e., simulating project portfolio allocation scenarios that satisfy the story-level constraints) and higher level (i.e., generating optimized project portfolio allocation scenarios that satisfy the optimization criteria associated with one or more iterations in a release, the entire release or at a feature level). Consequently, the project management system 200 advantageously provides the user with an optimum set of scenarios to review.

Figure 4:
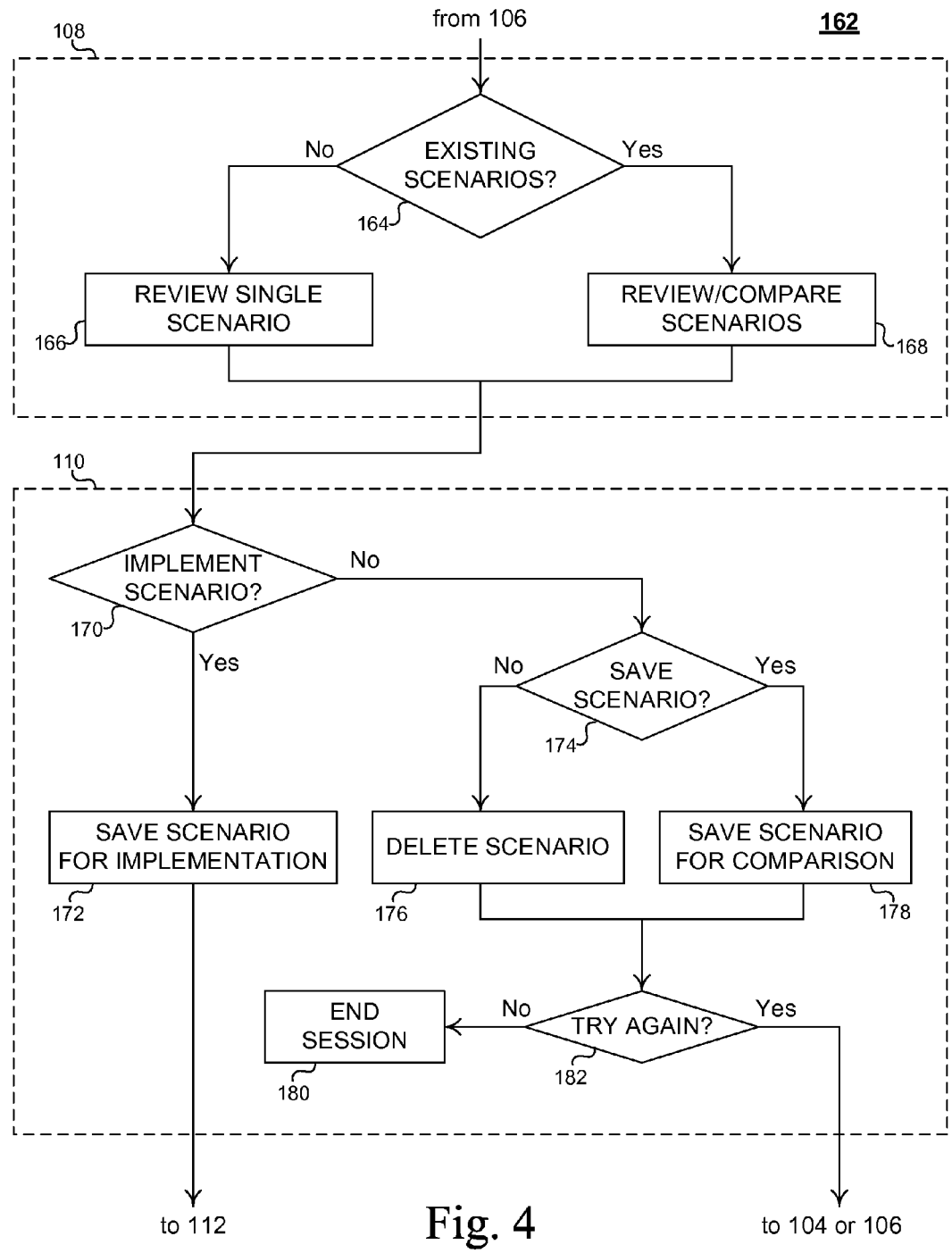
FIG. 4 is an exemplary flowchart depicting general process flows associated with reviewing story-level allocation scenarios and user selection of story-level allocation scenarios.

FIG. 4 is a flowchart 162 depicting general process flows associated with reviewing story-level allocation scenario(s) (step 108) and user selection of story-level allocation scenario(s) (step 110) according to some embodiments. Reviewing story-level allocation scenario(s) (step 108) can include determining whether there are any existing allocation scenarios (e.g., either a baseline scenario or previously simulated scenarios) (step 164), reviewing a single story-level allocation scenario if there are no existing scenarios (step 166) or reviewing/comparing two or more story-level allocation scenarios if there are previously saved scenarios (step 168). Advantageously, comparing story-level allocation scenarios generated at two different points in time allows a manager to determine what is different between the scenarios and/or to help formulate feedback in possibly trying a new simulation with different optimization parameters and resource allocations.

User selection of at least one story-level allocation scenario (step 110) can include determining whether to implement a particular story-level allocation scenario for the current Agile iteration (step 170). If the scenario is selected for implementation, then the scenario is saved for implementation (step 172) and an action plan can subsequently be generated (step 112). If a user chooses not to implement a story-level allocation scenario for the current Agile iteration, then the user determines (step 174) whether to delete the story-level allocation scenario (step 176) or save the story-level allocation scenario for comparison and/or implementation at a later iteration (step 178). The user can determine whether to end the session (step 180) or to reiterate the process (step 182) by trying to generate additional scenario simulations with existing parameters (step 106) or modify the input parameters to generate different simulations (step 102).

Generating an action plan for a selected story-level allocation scenario (step 112) can include generating instructions to resource managers and/or project managers to affect an actual change of resource allocation(s) and/or iteration assignment of iteration to stories. An action plan can also include a set of data highlighting changes necessary to move from the current state of allocation of resources to stories to the desired story-level allocation scenario. For example, an action plan can include acquisition of addition resources to meet an anticipated need, such as hiring more human personnel and/or purchasing more physical resource. An action plan can also provide provisions for training existing human personnel or upgrading existing physical resources.

In some embodiments, the project management system 200 can provide a list of the gaps in resources to a user, highlighting those resource demands by stories that cannot be satisfied due to resource unavailability. Based on the list, the project management system 200 can generate one or more action plans to remedy the resource gaps, such as plans to perform additional hiring, outsourcing, or training. These plans can be implemented during the current or subsequent Agile iterations, after which resource availability in the project management system can be updated accordingly.

Figure 5:
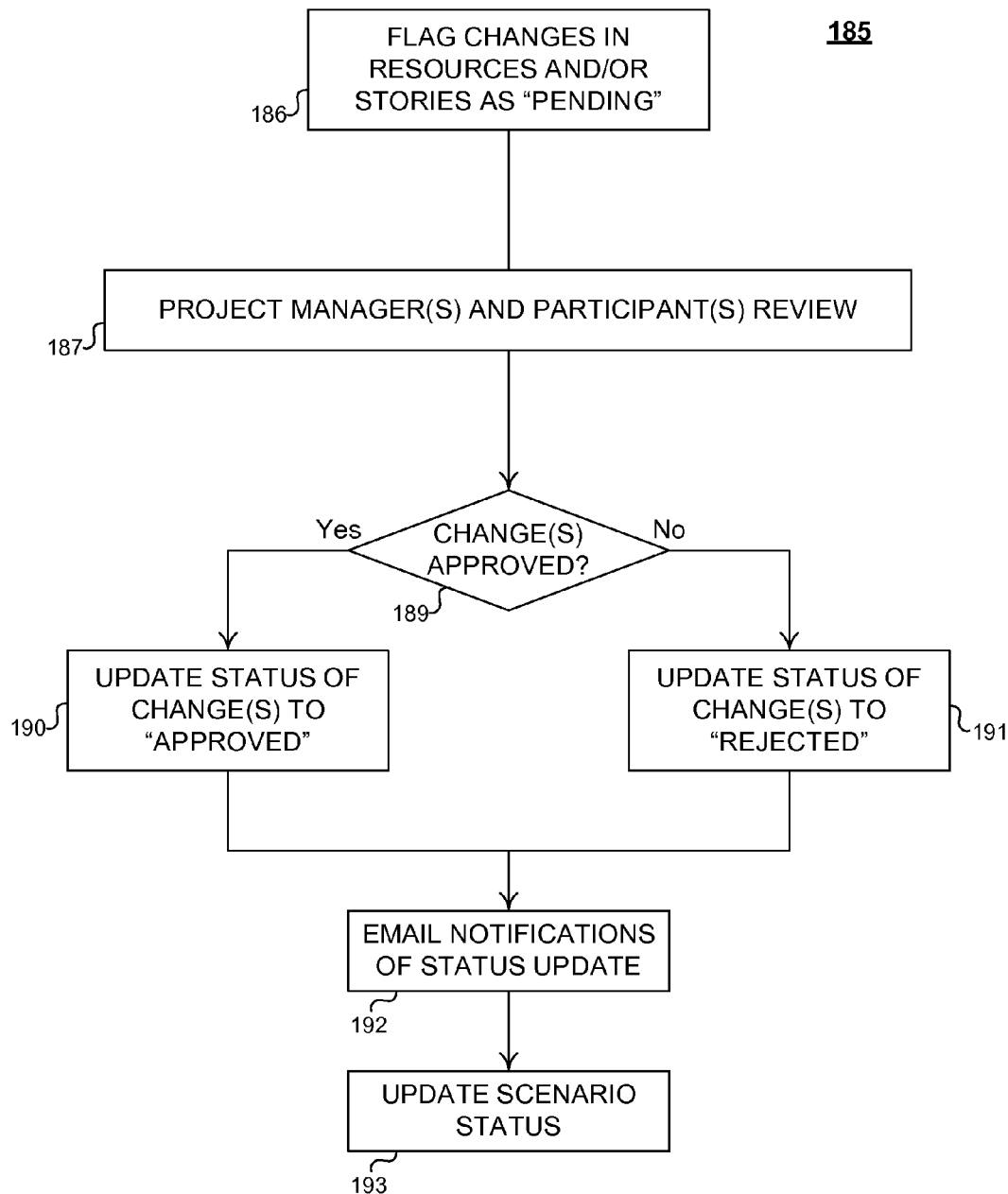
FIG. 5 is an exemplary flowchart depicting a general process flow associated with approval of resource and/or story changes.

FIG. 5 is a flowchart 185 depicting a general process flow associated with approval of resource and/or story changes that result from the selection of an optimized story-level allocation scenario (step 110) according to some embodiments. In particular, flowchart 185 details a process (e.g., a handshake process) for implementing a simulated story-level allocation scenario. An action plan is first generated (step 112), which can include generating a set of data indicating the one or more changes necessary to move from the baseline state of the project to the desired project represented by the story-level allocation scenario that was selected for implementation. Implementation of a project can include flagging changes in resource allocations and/or story scheduling as "pending" (step 186), sending flagged changes to project managers and project participants for review (step 187), determining whether any change has been approved (step 189), updating the status of approved change(s) to be "approved" (step 190) and of unapproved change(s) to be "rejected" (step 191), emailing notifications of status updates (step 192), and/or updating the status of the story-level allocation scenario (step 193). In some embodiments, sending flagged changes to project managers and project participants for review (step 187) can be implemented using the handshake/organization data API 240 in order to interface with existing resource/project management systems 270 and/or HR management systems 280, as shown in FIG. 6A.

Figure 6A:
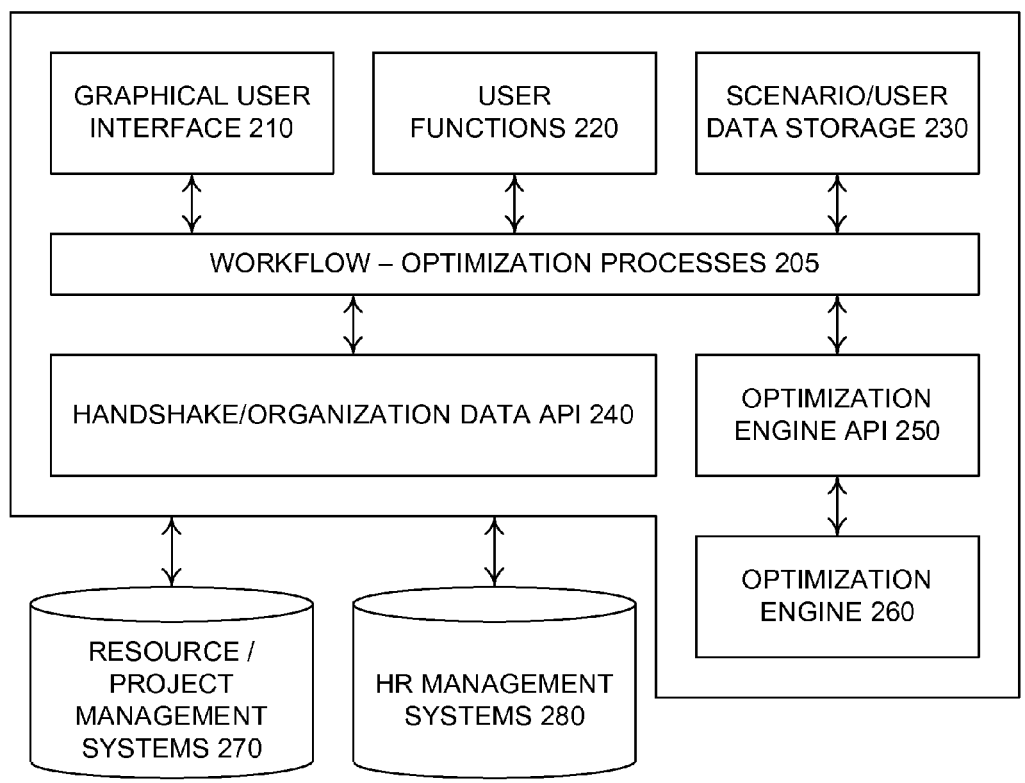
FIG. 6a is an exemplary block diagram showing a design of a project management system.

FIG. 6A is a block diagram showing a design of a project management system 200 according to some embodiments. The project management system 200 includes a combination of processes and software modules. The workflow of the Agile optimization processes 205 can be described using the exemplary flowcharts 100, 150, 162 and 185 of FIGS. 1 and 3-5, respectively. Software modules can include a graphical user interface (GUI) module 210, a user functions module 220, a scenario and user data storage module 230, a handshake/organization data application interface (API) module 240, an optimization engine API module 250, and/or an optimization engine module 260. In some embodiments, the project management system 200 can also be implemented as a Software as a Service (SaaS) (e.g., deployed to run over the Internet and/or a private local or wide area network).

GUI module 210 can handle user access (e.g., login and/or logout), user administration (e.g., any of the administration functions associated with the support and/or management of the system 200), widget management (e.g., providing the end user with the capability to arrange and save preferences for display of data within the browser area), and/or other GUI services.

User function module 220 can provide functions to users in their use of the project management system 200. For example, user function module 220 can include a story-level allocation scenario comparison engine (e.g., to allow the user to compare different scenarios (step 168)), an organization browser, a schedule manager module (e.g., to allow the user to modify in any way the assignment of a story to an iteration), an optimization parameter control module (e.g., during step 106 to provide the user with an interface to modify the objective function for the approach illustrated in FIG. 3, thus providing flexibility for optimizing resource allocation and scheduling associated with one or more stories), a resource management module (e.g., during steps 102 or 104 to allow the user access to view/define resource information, such as skills/roles/locations/costs, and/or to manually assign resources to one or more stories), a deferred stories module (e.g., to manage and/or alert the user about stories that have been deferred), an import/export module (e.g., to load previously saved scenarios or to save scenarios to a storage device), and/or other modules that specify user functions.

In some embodiments, the schedule manager can allow the user direct interaction with multiple story schedules and resource allocations. The schedule manager can also display outcome(s) and/or change(s) associated with an optimization calculation, highlight stories based on selected criteria (e.g. low/medium/high risk), allow a user to view story resource information in greater detail, and/or highlight dependencies that impact rescheduling. The scenario comparison engine can allow comparison(s) of key information across each scenario to inform the user's decision making. The organization browser can allow the user to select a level in organization for optimization activity, can integrate with an HR system for organization detailed information, and/or can cross references organization data with story and/or resource data to form appropriate views. The optimization parameter control module can allow the user to select optimization parameter(s) for each scenario, view parameter(s) selected by currently active scenarios, and/or set/view color coding associated with variations in parameter levels. The resource management module can provide collated view(s) of all stories, drill down capability by categorization, dynamical updates based on optimization changes, and/or resource thresholds that can be set graphically to highlight over/under runs versus leveled plans. The deferred stories module can provide a memory storage management for cancelled stories (either manually or via optimization). The import/export module can provide capability for import and export of a variety of information form the system (e.g., scenario information, comparison data, parameters, and/or deferred story data).

Scenario and user storage module 230 can provide processing functions for a data model that can be used as part of the creation, optimization and/or management of story-level allocation scenarios. For example, as a part of the initial input of resource, story and iteration information (step 102) and/or optimization criteria and allocation information (step 104) from a project management system, module 230 can store a baseline set of data within a base schema. The base schema can reflect both the working data model as well as an interface API schema mapping. Scenario and user storage module 230 can also provide functionality to save/load story allocation scenarios. Workflow status (e.g., draft, submitted, in-planning, executed, complete, etc.) can also be stored in a data model.

Organization data API module 240 can provide integration with workflows from other resource/project management systems 270 and/or HR management systems 280. In some embodiments, the design for an interface with other resource and project management systems can use the following type of model APIs through web services. Each web service can include a base class with several to many methods plus related data set classes. The system can include three general kinds of APIs: generic APIs (e.g., APIs that explore other resource/project management systems 270), project-specific APIs that are specific to performance and target Project Web Access features, and project-specific APIs that are available through the Shared Service Provider URL, but only have public methods documented.

Optimization engine API module 250 can provide a two way API with state awareness held either at the side of optimization engine module 260 or at the side of the workflow engine 205. Optimization engine API module 250 can forward any information regarding a story-level scenario (e.g., resource information, story definitions, current allocations, etc.), and any input information established (step 104) by the user. Initially, a baseline story-level allocation scenario data set can be sent to optimization engine 260 with initial constraints parameters. After optimization engine 260 has performed a simulation, it can provide feedback to the workflow 205 including updated information on the simulated story-level allocation scenario.

Optimization engine module 260 can perform two functions: generate optimized story-level allocation scenario(s) (step 108) and/or provide output detailing any change (step 112) associated with an input story-level allocation scenario after processing.

Figure 6B:
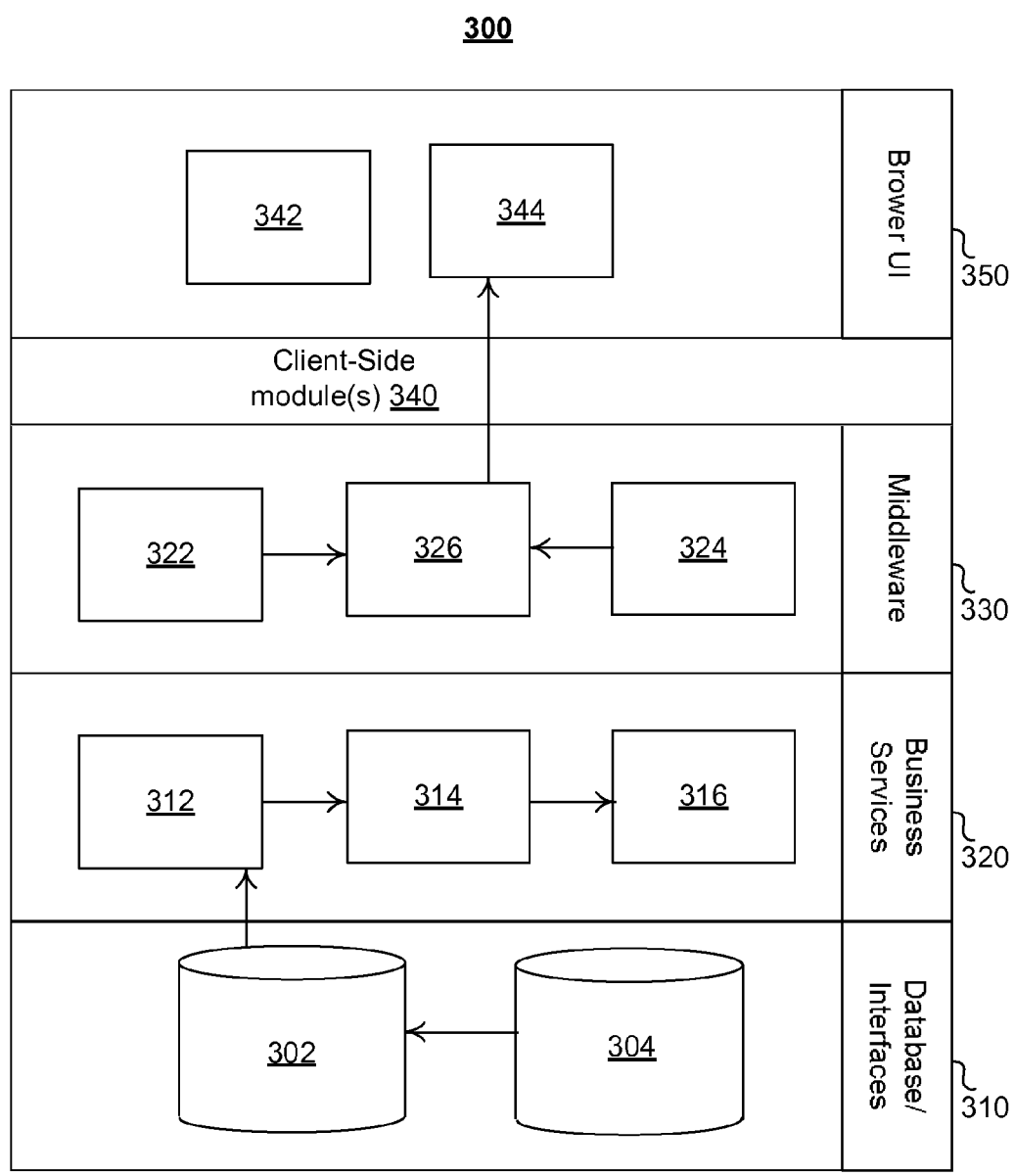
FIG. 6b shows exemplary architecture for deploying a project management system.

FIG. 6B is an exemplary system architecture 300 for deploying the project management system 200. The architecture includes database(s) 310, business services module(s) 320, middleware module(s) 330, client-side module(s) 340 and browser user interface(s) (UIs) 350.

The database(s) 310 can include one or more oracle databases 302 for storing story definitions, resource information, iteration information and release information from one or more data sources 304 (step 102). In addition, the oracle databases 302 can store allocation information, such as prior baseline story-level allocations, and optimization criteria (step 104).

The business services module(s) 320 perform optimization related functions. The business services modules 320 can include a resource module 312 for modeling resource availability and/or demand using, for example, the Hibernate program, which can map resource information in the databases 302 to Java classes and provide data query and retrieval functions. The resource models generated by the resource module 312 are provided to the services module 314, which transforms the business resource models from the resource module 312 to optimization domain models that can be consumed by the optimization module 316. The services module 314 can also provide reverse transformation from optimization domain models to business resource models. Based on the optimization domain models generated by the services module 314, the optimization module 316 allocates resources to stories by performing constraint-based programming. In an exemplary implementation, constraint programming is implemented using CHOCO, a java-based library designed to solve constraint-based problems.

The middleware module(s) 330 connect back-end components (e.g. the database(s) 310 and the business services module(s) 320) to client-side applications 340. The middleware module(s) 330 can include a remoting and web-messaging module 322, such as BlazeDS, for allowing a user to connect to back-end distributed data and push data to applications. The middleware module(s) 330 can also include a model-view-controller (MVC) module 324 for isolating domain logic (e.g., application logic for the user) from user interface (e.g., input and presentation), thus permitting independent development, testing and maintenance of each. The two modules 322 and 324 are connected to a security module 326, implemented in the Spring framework, for example, to provide authentication function and control user access to the back-end data.

The client-side module(s) 340 include one or more web applications, executable in a browser, for accessing back-end programs through the middleware modules 330.

The browser UIs 350 can include a resource UI 342 for allowing an end user to access the web applications implemented by the client-side module(s) 340, thus permitting user interaction with the back-end programs. The resource UI 342 can be implemented in Adobe Flex, Adobe Flash Player, or other types of multimedia software. The browser UIs 350 can also include a resource optimization UI 344, implemented in JavaScript, jQuery or Java Server Faces, for example. The resource optimization UI 344 can provide a user with a different (often optimized) user experience in comparison the resource UI 342. In some embodiments, the resource optimization UI 344 provides user access to the same back-end functionalities as the resource UI 342, but with different technology. In some embodiments, one or both of the resource UI 342 and the resource optimization UI 344 are connected to the security module 326 for authenticating the end user prior to allowing the end user to access resources through the UIs.

USE CASE EXAMPLES

FIGS. 7a-d are graphical user interfaces depicting use case examples for utilizing a project management system to simulate story-level allocation scenarios. FIGS. 7a-d are not necessarily drawn to scale; emphasis is instead generally being placed upon illustrating the principles of the invention. The project management system illustrated by the graphical user interfaces of FIGS. 7a-d can be a part of the exemplary project management system 200 of FIG. 6a, which can, in turn, use the process flows illustrated in FIGS. 1 and 3-5.

Figure 7A:
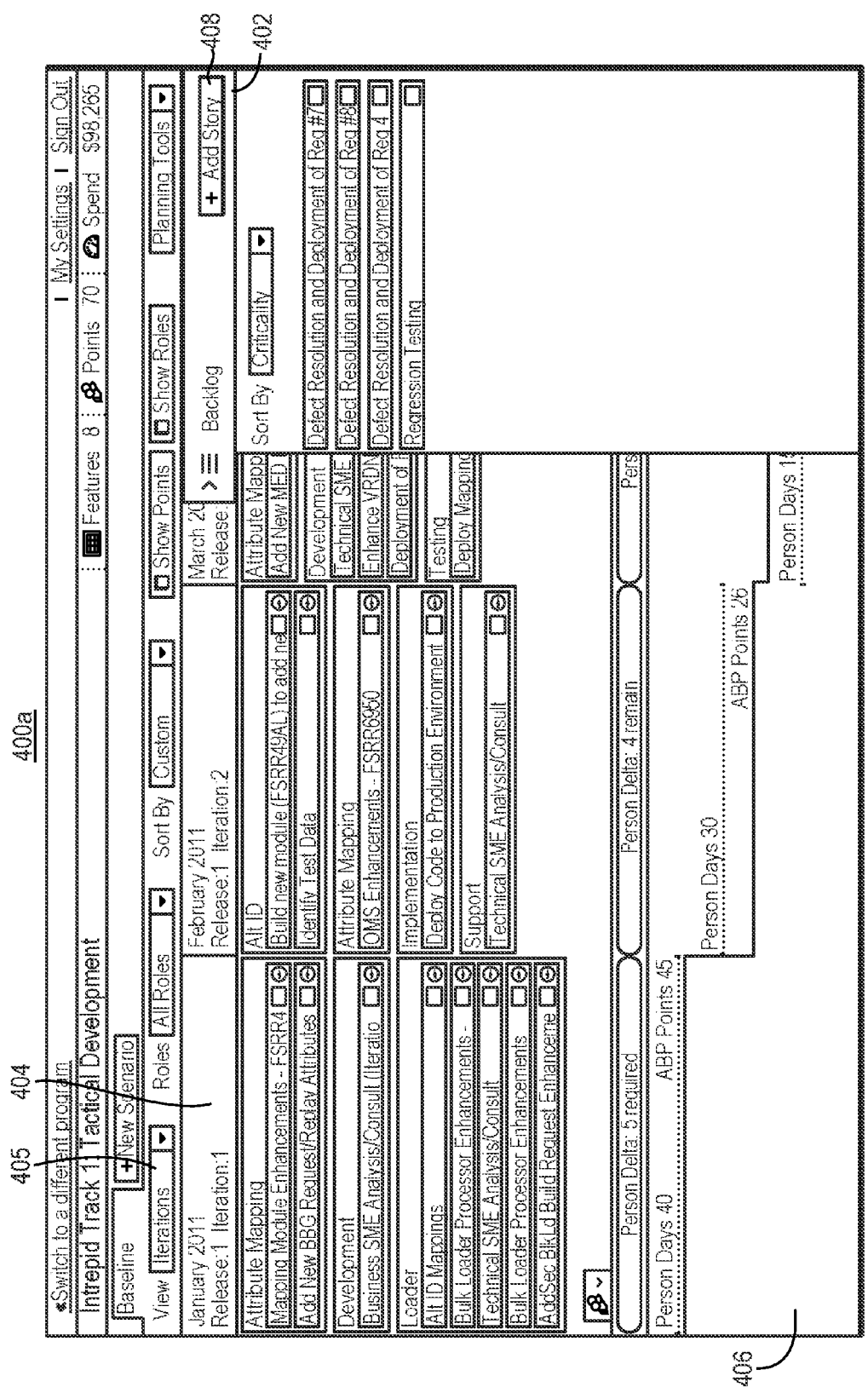
FIGS. 7a-d are exemplary graphical user interfaces depicting use case examples for utilizing a project management system to simulate story-level allocation scenarios.

FIG. 7a shows a graphical user interface 400a illustrating an exemplary story allocation scenario, which includes a backlog area 402, a display area 404, and a resource information area 406. The backlog area 402 provides a list of one or more stories yet to be scheduled as a part of a release. The project management system 200 is adapted to schedule as many stories in the backlog area 402 as possible subject to the constraints defined for the stories as well as higher-order optimization criteria selected from, for example, the user interface of FIG. 2. A user can add more stories to the backlog area 402 by activating the "add story" button 408. In addition, the stories in the backlog area 402 can be sorted by a number of constraints associated with the stories such that a user, based on the sorting, can instruct the project management program 200 which stories to schedule first. For example, stories situated highest in the list are likely to be scheduled first.

Once a story is scheduled by the project management system 200, the story appears in the display area 404, which shows assignment of stories to one or more iterations of different releases under an "iteration" view 405 of the display. For example, the story "Deploy Code to Production Environment" is assigned to Iteration 2 of Release 1. In some embodiments, an Agile category corresponding to an assigned story can be shown in the display area 404. For example, the story "Deploy Code to Production Environment" is associated with the "attribute mapping" category. In addition, the resource information area 406 illustrates the amount of available resources remaining for each iteration.

Figure 7B:
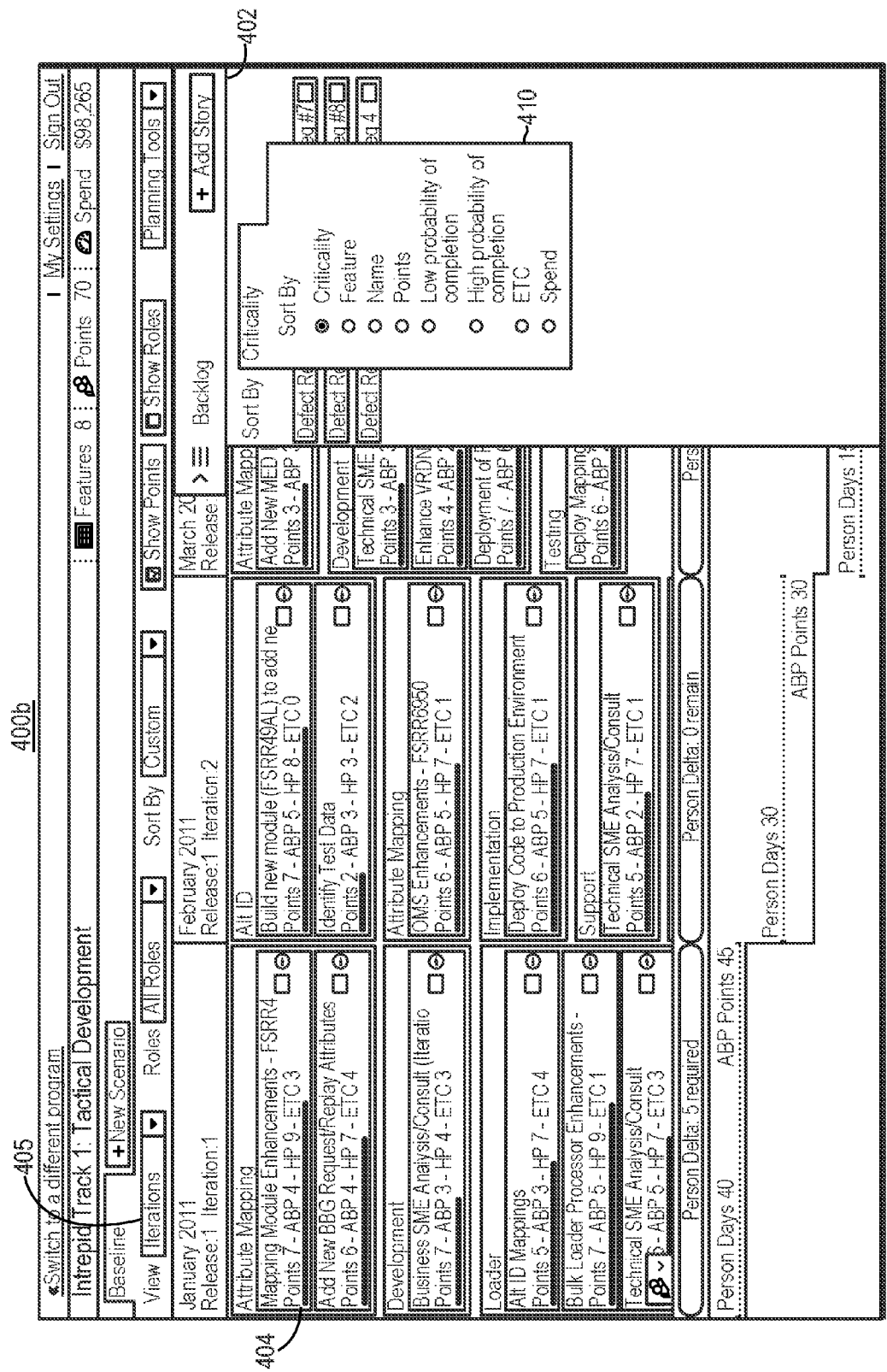

FIG. 7b shows a graphical user interface 400b illustrating another exemplary story allocation scenario. A user can sort the stories in the backlog area 402 by different story-level constraints provided in the pull-down menu 410, including a criticality constraint (e.g., the stories are ranked according to their criticality), a feature constraint (e.g., related stories in the same feature are grouped together on the list), a name constraint (e.g., stories are listed alphabetically by their unique identifiers), a points constraint (e.g., stories are sorted by the estimated number of days, expressed as points, to complete), a low probability of completion constraint (e.g., stories with a low probability of completion (i.e., require more effort) are ranked higher), a high probability of completion constraint (e.g., stories with a high probability of completion (i.e., require less effort) are ranked higher), a ETC constraint (e.g., stories are sorted by their "estimated effort to completion" rating). In addition, the display area 404 can show assignment of stories to iterations under the "iteration" view 405 of the display, along with the number of points associated with each assigned story. For example, the story "Deploy Code to Production Environment," which is assigned to Iteration 2 of Release 1, takes 6 points to complete. In addition, it has an ABP of 5, HP of 7 and ETC of 1.

Figure 7C:
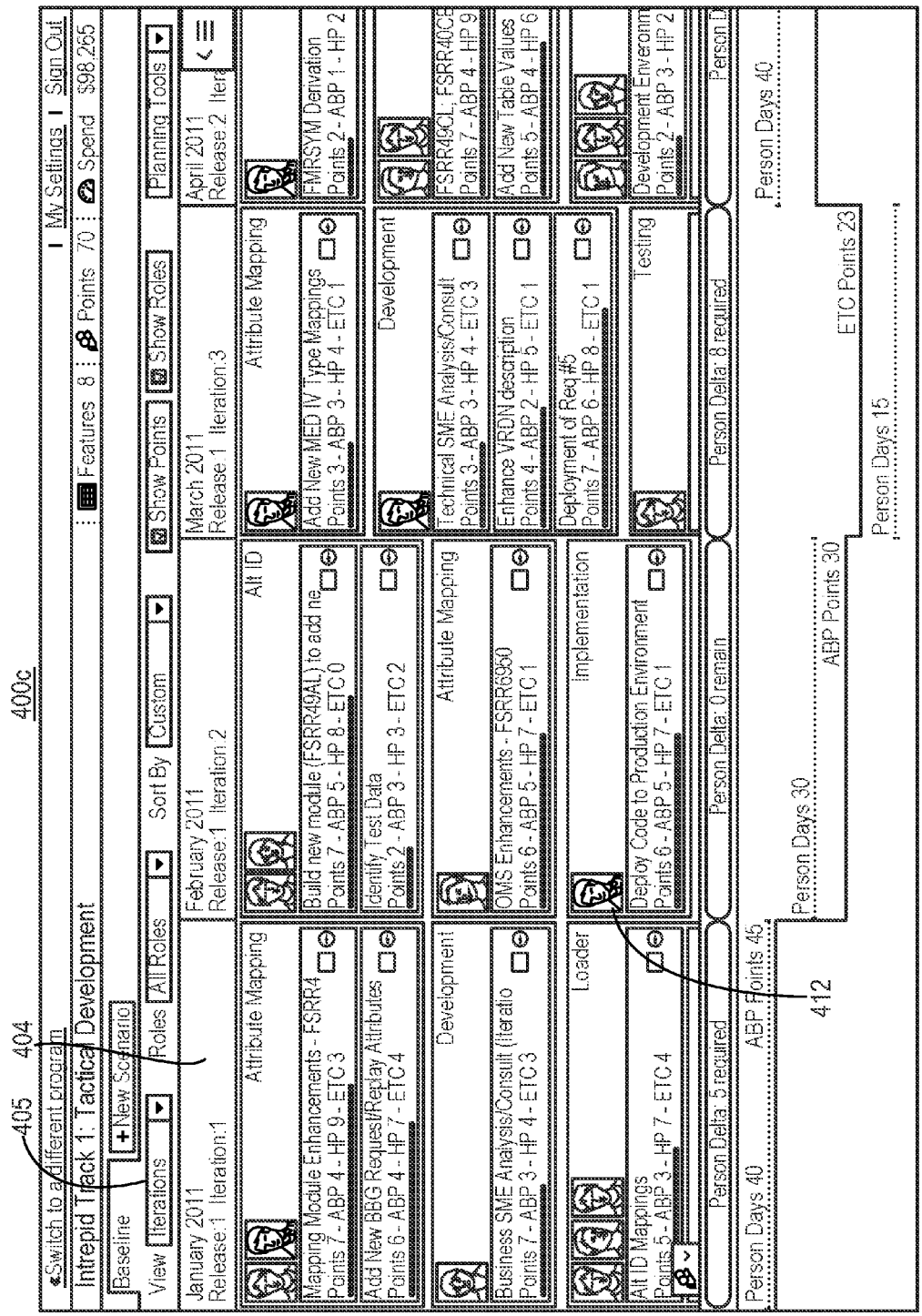

FIG. 7c shows a graphical user interface 400c illustrating another exemplary story allocation scenario. The display area 404, in addition to showing assignment of stories to iterations under the "iteration" view 405 and the number of points associated with each story, can also show the roles of the human resources assigned to complete each story. For example, the project management system 200 allocates one person 412 to complete the story "Deploy Code to Production Environment" during Iteration 2 of Release 1.

Figure 7D:
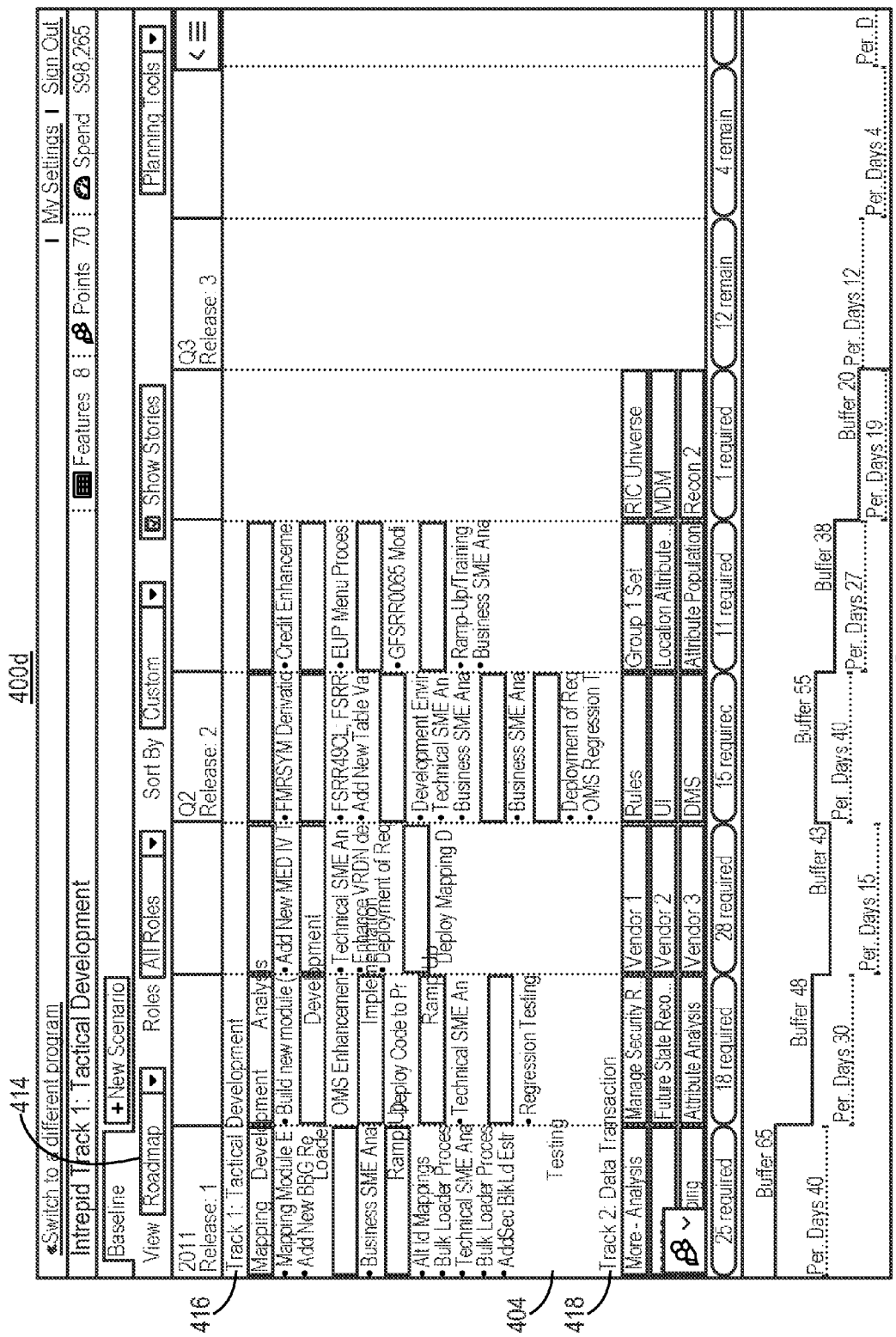

FIG. 7d shows a graphical user interface 400d illustrating another exemplary story allocation scenario. The display area 404 can show assignment of stories to releases under a "roadmap" view 414, which illustrates a story-level allocation scenario for multiple releases in the form of a timeline/roadmap. This format allows a user to review the overall impact on a particular release or on multiple releases when functionalities scheduled for delivery are changed. This timeline can be changed with each Agile iteration as well as with each change in constraints. In some embodiments, display of the timeline/roadmap 404 can provide zoomed-in or zoom-out views.

In some embodiments, the project management system supports simultaneous scheduling and resource allocation for multiple projects. Specifically, the project management system can execute the general process flow of FIG. 1 for multiple projects concurrently. In the exemplary graphical user interface 400d of FIG. 7d, allocation and scheduling status for multiple projects are shown under different "tracks," such as under tracks 416 and 418. These tracks allow an end user to organize multiple streams of work concurrently. In some embodiments, projects are divided into tracks by geography, domain and/or product division. In some embodiments, a different backlog is maintained for each track, which includes its own set of resources available for allocation to the corresponding track. Alternatively, a common backlog can be maintained for all or a portion of the tracks.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system (e.g., a cloud-computing system) that includes any combination of such back-end, middleware, or front-end components. The above described techniques can be implemented as a Software-As-A-Service (SaaS) model or using a multi-tiered approach.

Communication networks can include one or more packet-based networks and/or one or more circuit-based networks in any configuration. Packet-based networks can include, for example, an Ethernet-based network (e.g., traditional Ethernet as defined by the IEEE or Carrier Ethernet as defined by the Metro Ethernet Forum (MEF)), an ATM-based network, a carrier Internet Protocol (IP) network (LAN, WAN, or the like), a private IP network, an IP private branch exchange (IPBX), a wireless network (e.g., a Radio Access Network (RAN)), and/or other packet-based networks. Circuit-based networks can include, for example, the Public Switched Telephone Network (PSTN), a legacy private branch exchange (PBX), a wireless network (e.g., a RAN), and/or other circuit-based networks. Carrier Ethernet can be used to provide point-to-point connectivity (e.g., new circuits and TDM replacement), point-to-multipoint (e.g., IPTV and content delivery), and/or multipoint-to-multipoint (e.g., Enterprise VPNs and Metro LANs). Carrier Ethernet advantageously provides for a lower cost per megabit and more granular bandwidth options.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer, mobile device) with a world wide web browser (e.g., Microsoft® Internet Explorer® available from Microsoft Corporation, Mozilla® Firefox available from Mozilla Corporation).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A computer-implemented method, used in an Agile environment, for allocating resources across a plurality of stories in a project during a release and scheduling the stories across a plurality of iterations within the release, wherein 1) each story represents at least one task executable by an appropriate resource and 2) the release represents a deadline for delivering the stories and is divided into one or more iterations representative of a sequence of time periods within the release, the method comprising:

receiving, at a computing device, (i) resource information representing a plurality of resources available for allocation to the stories, (ii) one or more story-level constraints corresponding to each story, and iii) one or more optimization criteria for a level different from a story level, including an objective function defined by the equation $$\max\left(\sum_{k=1}^{n} F[S_k]S[S_k]\right)$$

wherein n represents the number of stories in one or more iterations, $S_k$ represents the kth story in the one or more iterations, function F represents a feature-points function, and function S represents a successful and on-time completion function;

applying, using the computing device, a first-level optimization scheme to generate a plurality of story-level allocation scenarios, wherein applying the first-level optimization scheme comprises:

assigning an iteration to each of the stories;

allocating one or more of the plurality of resources to one or more of the stories; and satisfying the one or more story-level constraints associated with each story; and applying, using the computing device, a second-level optimization scheme to determine one or more optimized story-level allocation scenarios from the plurality of story-level allocation scenarios, by optimizing assignment of iterations and allocation of resources to the stories while satisfying the one or more optimization criteria.

2. The computer-implemented method of claim 1 wherein applying a second-level optimization scheme to determine one or more optimized story-level allocation scenarios comprises:

selecting, using the computing device, a first story-level allocation scenario from the plurality of the story-level allocation scenarios; and revising, using the computing device, assignment of iterations or allocation of resources to at least one story in the first story-level allocation scenario to satisfy the one or more optimization criteria.

3. The computer-implemented method of claim 1 wherein the level different from the story level includes an iteration level, a release level, or a feature level.

4. The computer-implemented method of claim 1 wherein applying a second-level optimization scheme to determine one or more optimized story-level allocation scenarios comprises:

determining, using the computing device, an order for applying the one or more optimization criteria; and determining, using the computing device, the one or more optimized story-level allocation scenarios by satisfying the plurality of optimization criteria successively applied in the order.

5. The computer-implemented method of claim 1 further comprising automatically executing, by the computing device, the applying steps upon detecting a change to at least one of the resource information, the story-level constraints, information related to the release, information related to at least one of the iterations, or the optimization criteria.

6. The computer-implemented method of claim 1 wherein the one or more story-level constraints comprise: one or more start dates or date ranges, one or more end dates or date ranges, one or more resource constraints, a cost constraint, one or more location constraints, or any combination thereof.

7. The computer-implemented method of claim 1 wherein the one or more optimization criteria comprise a resource utilization criterion, a schedule criterion, a risk level criterion, a maximum-number-of-features criterion, or any combination thereof.

8. The computer-implemented method of claim 1 further comprising generating an action plan based on the one or more optimized story-level allocation scenarios, the action plan comprising at least one of modifying resource allocation of the plurality of resources or acquiring additional resources.

9. The computer-implemented method of claim 1 wherein the plurality of resources comprise one or more human resources, one or more physical resources, or any combination thereof.

10. The computer-implemented method of claim 1 wherein the plurality of resources comprises one or more physical resources including one or more computer resources, one or more geographic locations, one or more supply materials, one or more equipment items, or any combination thereof.

11. The computer-implemented method of claim 1 wherein the resource information comprises attribute information for one or more of the plurality of resources.

12. The computer-implemented method of claim 11 wherein the attribute information comprises skills information, geographic location information, language information, availability information, or any combination thereof, for one or more human resources.

13. The computer-implemented method of claim 1 wherein the story-level constraints corresponding to each story further include information indicating a priority level.

14. The computer-implemented method of claim 13 wherein allocating one or more of the plurality of resources to one or more of the stories comprises allocating resources to a first story before allocating resources to a second story, wherein the first story is associated with a first priority level higher than a second priority level associated with the second story.

15. The computer-implemented method of claim 1 wherein assigning an iteration to each of the stories comprises assigning, using the computing device, a null value to at least one story indicating that the story is canceled or not scheduled for the release.

16. A computer program product, tangibly embodied in a non-transitory machine-readable storage device, for allocating resources across a plurality of stories in a project during a release within an Agile environment and scheduling the stories across a plurality of iterations within the release, wherein 1) each story represents at least one task executable by an appropriate resource and 2) the release represents a deadline for delivering the stories and is divided into one or more iterations representative of a sequence of time periods within the release, the computer program product including instructions being operable to cause data processing apparatus to:

receive (i) resource information representing a plurality of resources available for allocation to the stories, (ii) one or more story-level constraints corresponding to each story, and iii) one or more optimization criteria for a level different from a story level, including an objective function defined by the equation $$\max\left(\sum_{k=1}^{n} F[S_k]S[S_k]\right)$$

wherein n represents the number of stories in one or more iterations, $S_k$ represents the kth story in the one or more iterations, function F represents a feature-points function, and function S represents a successful and on-time completion function;

apply a first-level optimization scheme to generate a plurality of story-level allocation scenarios, wherein apply the first-level optimization scheme comprises:
  assign an iteration to each of the stories;
  allocate one or more of the plurality of resources to one or more of the stories;
  and satisfy the one or more story-level constraints associated with each story; and apply a second-level optimization scheme to determine one or more optimized story-level allocation scenarios from the plurality of story-level allocation scenarios, by optimizing assignment of iterations and allocation of resources to the stories while satisfying the one or more optimization criteria.

* * * * *